April 9, 1968 H. A. BREEDING ET AL 3,377,042
FASTENER DEVICE
Filed Dec. 13, 1965
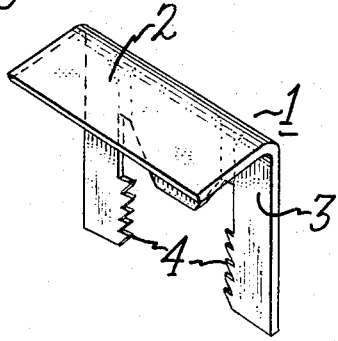
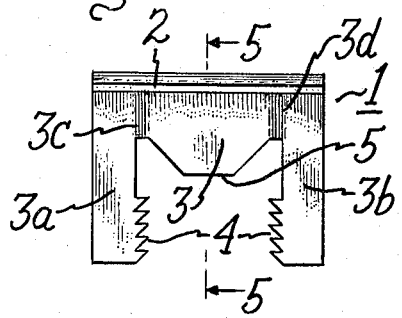
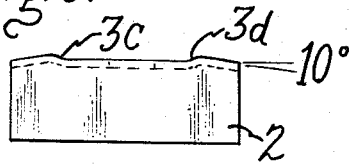
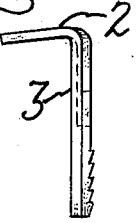
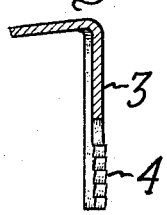
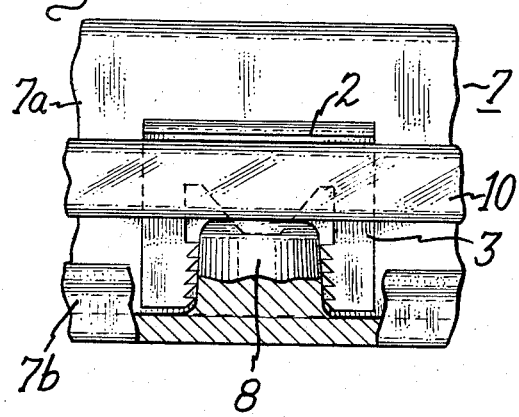
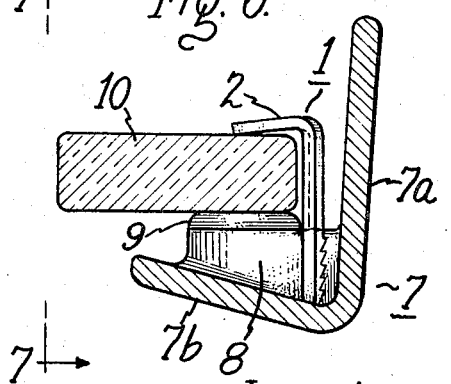
Inventors,
Harold A. Breeding,
Robert M. Cheadle,
by Sidney Greenberg
Their Attorney.

3,377,042
FASTENER DEVICE
Harold A. Breeding and Robert M. Cheadle, Hendersonville, N.C., assignors to General Electric Company, a corporation of New York
Filed Dec. 13, 1965, Ser. No. 513,420
6 Claims. (Cl. 248—316)

ABSTRACT OF THE DISCLOSURE

Resilient clip for holding window pane in frame comprises bent U-shaped member having serrated gripping legs.

---

The present invention relates to fasteners such as clips, and more particularly to a clip especially adapted for removably retaining a glass window panel or the like in a frame.

It is an object of the present invention to provide an improved fastening device or clip of simple, inexpensive construction having general use for removably securing parts together.

It is another object of the invention to provide a spring clip of the above type which effectively holds a glass panel or the like in position within a supporting frame while permitting ready disassembly thereof, and which is quickly and easily applied without the use of tools.

Other objects and advantages will become apparent from the following description and the appended claims.

With the above objects in view, the invention relates to a fastener device comprising, in combination, a flat strip of spring material of generally L-shape, having a clip portion and a bearing flange portion extending transverse the clip portion, the clip portion being of substantially U-shape and formed with spaced flat legs having inner edges facing each other, the inner facing edges having gripping means thereon.

The invention will be better understood from the following description taken in conjunction with the accompanying drawing, in which:

FIGURE 1 is a perspective view of a fastener device constructed in accordance with the invention;

FIGURE 2 is a front elevational view of the FIGURE 1 device;

FIGURE 3 is a top plan view of the fastener device;

FIGURE 4 is a side elevational view of the fastener device;

FIGURE 5 is a cross-sectional view of the fastener device taken along the line 5—5 of FIGURE 2;

FIGURE 6 is a fragmentary view of a glass pane held in assembly to a supporting frame by means of a fastener device in accordance with the invention; and FIGURE 7 shows the FIGURE 6 assembly as viewed along the line 7—7.

Referring now to the drawing, and particularly to FIGURES 1–5, there is shown a fastener device 1 comprising a strip of spring metal such as stainless steel bent into L-shape so as to have a top flange or bearing portion 2 and a clip or gripping portion 3. The latter portion has a substantially U-shaped form with legs 3a, 3b projecting downwardly from the flange 2, each leg having along its lower inner edge a series of teeth or serrations 4. Portion 3 is further formed with an intermediate projection 5 which extends downwardly into the space between legs 3a, 3b but terminates above the level of the uppermost teeth 4. Legs 3a, 3b are twisted slightly rearwardly (e.g., about 10°) from the plane of portion 3, as shown in FIGURE 3, so that teeth 4 project slightly rearwardly from portion 3. As shown in FIGURE 2, the twist is accomplished preferably by suitably bending portion 3 in the regions 3c, 3d at the base of legs 3a, 3b, in order to retain mechanical strength of the legs while still affording the desired resiliency thereof.

The application of the described fastener device to a window frame for holding a glass window in place on a supporting frame is shown in FIGURES 6 and 7. As seen in FIGURE 6, metal frame 7, such as may be used for a floodlight as described in co-pending application Ser. No. 441,646 filed Mar. 22, 1965, is formed of a side portion 7a and a front portion 7b, the latter having on its inner surface a metal boss 8, such as aluminum (of which the frame itself may be made) boss 8 being provided with a resilient (e.g. rubber) pad or bumper 9. It will be understood that frame 7 has a plurality of such bosses 8 with bumpers 9 spaced around its periphery for supporting the glass panel. Glass panel 10 rests on bumper 9 and is secured in removable assembly with frame 7 by arranging fastener device 1 so that its legs 3a, 3b straddle boss 8 (see FIGURE 7) and then pushing the clip down on the boss until projection 5 comes into contact with the surface of boss 8. The slight rearward twist of the legs described previously allows them to spring or flex about their longitudinal axes without distortion during such installation and provides for a resilient gripping of teeth 4 on opposite sides on boss 8 to firmly hold glass panel 10 in position against bumper 9. The parts are preferably so proportioned that in the final assembly, all the teeth 4 grip the sides of boss 8, projection 5 comes into contact with the top of boss 8, and flange 2 of the clip either bears resiliently on the surface of glass panel 10 or is spaced slightly therefrom to allow for thermal expansion of glass if desired or necessary. Removal of the fastener device is accomplished simply by prying up flange 2 until gripping teeth 4 are free from engagement with boss 8.

Projection 5 serves, as indicated, as a stop for contacting the upper surface of boss 8 to properly position the fastener as mentioned above. In addition, it prevents clip from being pushed down too far on boss 8 which, being enlarged at its lower end in a usual construction, might otherwise cause the lower ends of legs 3a, 3b to be unduly spread apart and thereby distorted in shape. However, projection 5 is not always necessary, and may be dispensed with or may have no stop function in cases where this feature is not desired or necessary.

The flat strip form of the fastener and its gripping legs provide a high strength-to-weight ratio and enables the fastener to resiliently retain its operational shape even after repeated use. Moreover, because of its minimal thickness it can be employed in very narrow spaces as shown in FIGURE 6, while still affording high-strength holding properties.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A fastener device comprising, in combination, a flat strip of spring material having a generally L-shape and comprising a clip portion extending in one plane and a bearing flange portion extending in another plane transverse said clip portion, said clip portion being U-shaped and formed with spaced flat legs extending substantially in said one plane with inner edges facing each other, said inner facing edges having gripping means thereon for gripping engagement with a support.

2. A fastener device as defined in claim 1, wherein said gripping means are constituted by serrations formed on said inner facing edges.

3. A fastener device as defined in claim 2, wherein said flat legs are twisted slightly away from the plane of said clip portion as a balancing and flexing means.

4. A fastener device as defined in claim 3, wherein said strip of material is composed of spring metal.

5. A fastener device as defined in claim 4, wherein said clip portion includes a projecting stop portion intermediate said flat legs extending from said bearing flange portion into the space between said legs.

6. An assembly comprising, in combination, support means having a boss projecting therefrom, an object resting on said boss, and a fastener device as defined in claim 5 arranged with its legs straddling and gripping said boss adjacent to said object and said bearing flange portion thereof engaging said object and holding it in removable assembly with said support means.

References Cited
UNITED STATES PATENTS

| | | | |
|---|---|---|---|
| 2,788,558 | 4/1957 | Bowers | 24—222 |
| 2,915,267 | 12/1959 | Kaysing | 248—67.5 |
| 3,281,066 | 10/1966 | Becklin | 211—89 X |

JOHN PETO, *Primary Examiner.*